C. B. BERST.
ELECTRICAL MEASURING INSTRUMENT.
APPLICATION FILED MAR. 2, 1917.

1,292,571.  Patented Jan. 28, 1919.

WITNESSES:
Ed Plinke.

INVENTOR
Charles B. Berst.
BY
ATTORNEY

UNITED STATES PATENT OFFICE.

CHARLES B. BERST, OF ERIE, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,292,571.     Specification of Letters Patent.     Patented Jan. 28, 1919.

Application filed March 2, 1917. Serial No. 152,015.

*To all whom it may concern:*

Be it known that I, CHARLES B. BERST, a citizen of the United States, and a resident of Erie, in the county of Erie and State of Pennsylvania, have invented a new and useful Improvement in Electrical Measuring Instruments, of which the following is a specification.

My invention relates to electrical measuring instruments and particularly to commutating devices for motor-meters.

One object of my invention is to provide a commutating device for a motor-meter that shall have means for commutating the current supplied to the meter without the necessity of using commutator brushes, thereby permitting a relatively large amount of current to be commutated without the attendant difficulties of the brushes becoming heated.

Another object of my invention is to provide a commutating device of the above indicated character that shall be substantially frictionless, thereby permitting the meter to which it is connected to operate more accurately under varying conditions of service.

In the carrying out of my invention, I provide a mercury-containing receptacle having diametrically disposed contact terminals extending therethrough into the interior of the receptacle in which is disposed a disk having conducting and non-conducting segments. The conducting segments are operatively connected to the windings of the motor-meter to which the device is applied, and portions of the conducting segments that are not adjacent the contact terminals are insulated from the mercury. By such an arrangement, relatively large currents may be commutated and the light-load friction of the meter will be materially reduced.

Figure 1:
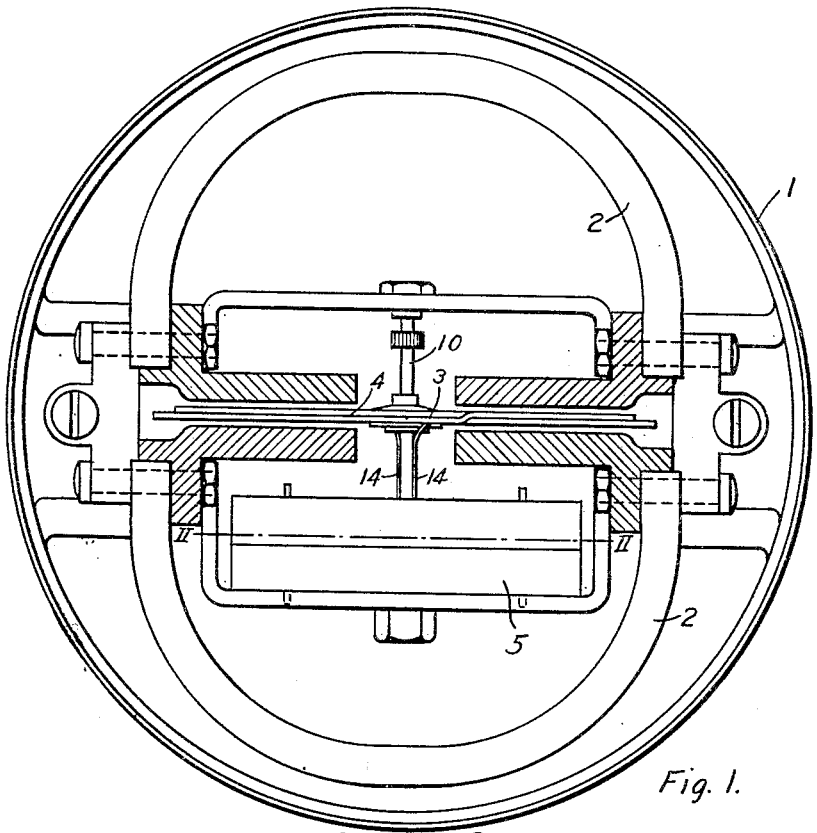
Figure 2:
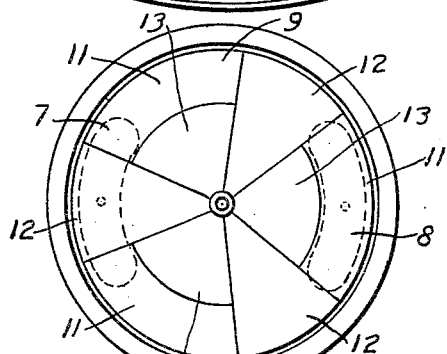
Figure 3:
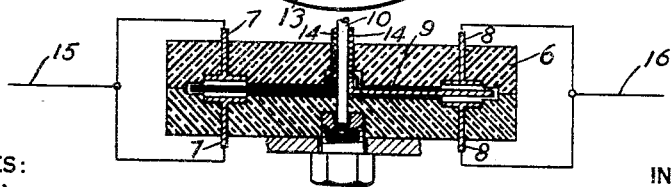

In the accompanying drawings, Figure 1 is a front elevational view of a motor-meter embodying my invention; Fig. 2 is a sectional view taken along the line II—II of Fig. 1, and Fig. 3 is a view, partially in section and partially in elevation, of the commutating device shown in Figs. 1 and 2.

The measuring instrument which embodies my invention comprises, in general, a casing 1, permanent magnets 2, a rotatable armature 3 having a plurality of windings 4 thereon, and a commutating device 5.

The commutating device 5 comprises a two-part insulating receptacle 6 having openings therein to receive contact-terminal members 7 and 8 that are diametrically disposed with respect to each other and a disk member 9 that is mounted on the shaft 10 of the meter. The disk 9 comprises a plurality of conducting segments 11 that are separated by insulating segments 12. The portions 13 of the segments 11 that do not pass adjacent the contact terminal members 7 and 8 are painted or coated with some insulating material, thereby exposing only the portions of the conducting segments 11 that pass adjacent the contact terminal members 7 and 8. The opening between the two parts of the member 6 is filled with mercury or other conducting fluid which thus serves as a conducting medium between the conducting segments 11 and the contact terminal members 7 and 8. The segments 11 are operatively connected, through conductors 14, to the respective windings 4 on the armature of the meter.

The contact terminal members 7 are operatively connected to one conductor 15 of a circuit, and the contact terminal members 8 are operatively connected to another conductor 16. Thus, if it is desired to measure the current traversing a circuit, the conductors 15 and 16 may be connected to a load shunt (not shown) or directly in series with the circuit, the current of which is to be measured.

Since the opening between the two members of the receptacle 6 is relatively short and is occupied in part by the disk 9, it will be understood that a portion of the current which enters the device through the contact terminals 7 and 8 will traverse the segments 11. Consequently, the device will accurately commutate the current traversing the windings 4 and, at the same time, will serve to so support the movable members of the meter that the bearing friction and the friction usually incident to the commutation is substantially eliminated. Since, at light loads, a relatively large amount of the torque developed by a motor-meter is utilized in overcoming the friction of the same, it will be understood that, by the use of my invention, a more accurate and inexpensive meter may be provided because of the substantial absence of light-load friction.

I do not limit my invention to the particular structure illustrated, as it may be variously modified without departing from the spirit and scope of the invention as set forth in the appended claims.

I claim as my invention:

1. A commutating device comprising a receptacle, a conducting fluid therein, diametrically disposed contact-members therein, and a disk-type commutator member therein having portions of the conducting segments thereof insulated from the fluid.

2. A commutating device comprising a receptacle, a conducting fluid therein, diametrically disposed contact-members therein, and a disk-type commutator member therein having portions of the conducting segments thereof that are not adapted to pass adjacent to the contact-members insulated from the fluid.

3. A commutating device comprising a stationary-insulating receptacle, a conducting fluid therein, contact members disposed in the fluid and a rotatable disk disposed in the fluid and having alternate conducting and non-conducting segments adapted to pass adjacent the contact-members.

4. A commutating device comprising a stationary insulating receptacle, a conducting fluid therein, contact terminals therein in engagement with the fluid, and a rotatable disk having alternate conducting and non-conducting segments, portions of said conducting segments being insulated from the conducting fluid.

5. A commutating device for a motor-meter comprising a mercury-containing receptacle, diametrically disposed contact terminals extending through the receptacle in contact with the mercury, and a rotatable disk having conducting and non-conducting segments, the portions of the conducting segments that are not adapted to pass adjacent to the contact terminals being out of engagement with the mercury.

6. A commutating device comprising a mercury-containing receptacle, diametrically disposed contact terminals therein in engagement with the mercury, and a rotatable disk having conducting and non-conducting segments adapted to pass adjacent the contact terminals.

7. A commutating device comprising a mercury-containing receptacle, diametrically disposed contact terminals therein in engagement with the mercury, and a rotatable disk having alternate conducting and non-conducting segments, portions of the said conducting segments being insulated from the mercury.

In testimony whereof, I have hereunto subscribed my name this 27th day of Feb., 1917.

CHARLES B. BERST.